United States Patent [19]

Booth et al.

[11] Patent Number: 5,004,314
[45] Date of Patent: Apr. 2, 1991

[54] OPTICAL SIGNAL MODULATION DEVICE

[75] Inventors: Richard C. Booth, Woodbridge; Alan R. Beaumont, Ipswich; Barbara E. Daymond-John, Woodbridge; David G. Cunningham, Felixstowe; William A. Stallard, Colchester, all of England

[73] Assignee: British Telecommunications public limited company, London, England

[21] Appl. No.: 209,622

[22] PCT Filed: Oct. 20, 1987

[86] PCT No.: PCT/GB87/00738
§ 371 Date: Jun. 24, 1988
§ 102(e) Date: Jun. 24, 1988

[87] PCT Pub. No.: WO88/03278
PCT Pub. Date: May 5, 1988

[30] Foreign Application Priority Data

Oct. 24, 1986 [GB] United Kingdom ............... 8625486

[51] Int. Cl.$^5$ ............................................. G02B 5/174
[52] U.S. Cl. .................................. 350/96.14; 350/374
[58] Field of Search ............... 350/96.12, 96.13, 96.14, 350/374, 355, 370

[56] References Cited

U.S. PATENT DOCUMENTS 4,291,939 9/1981 Giallorenzi et al. ............ 350/96.14

OTHER PUBLICATIONS

IEEE Journal of Quantum Electronics, vol. QE-17, No. 6, Jun. 1981 (IEEE, N.Y., U.S.A.), R. C. Alferness, "Guided-Wave Devices for Optical Comm.", pp. 946-959.

Optics Letters, vol. 5, No. 5, May 1980 (Optical Society of America, U.S.A.), C. H. Bulmer et al., "Linear Interferometric Waveguide Modulator for Electromagnetic-Field Detection", pp. 176-178.

Primary Examiner—William L. Sikes
Assistant Examiner—Akm E. Ullah
Attorney, Agent, or Firm—Nixon & Vanderhye

[57] ABSTRACT

An optical signal modulation device comprises first and second optical waveguides (1, 2) fabricated on Z cut lithium niobate. The waveguides (1, 2) are connected at one end to an optical signal splitter (7) and at the other end to a Y coupler (11). The output of the Y coupler (11) is connected to a single mode optical fibre (13). A first pair of modulator electrodes (3, 4) are positioned across the waveguides (1, 2) to cause relative phase shifts between signals in the two optical waveguides (1, 2) in response to a first control signal $V_1$. These relative phase shifts are caused in both TM mode and TE mode signals. The device also includes a second pair of bias electrodes (14, 15) arranged to cause a relative phase shift between signals of the TE mode only whereby the transfer characteristics of the two modes may be shifted relatively to one another in use in accordance with the second control function.

15 Claims, 2 Drawing Sheets

OPTICAL SIGNAL MODULATION DEVICE

FIELD OF THE INVENTION

The invention relates to an optical signal modulation device.

BACKGROUND AND SUMMARY OF THE INVENTION

Known optical signal modulation devices comprise first and second optical waveguides connected at one end to an optical signal splitting device which couples portions of an incoming optical signal into the waveguides and at the other end to an optical signal combining device which causes optical signals received from the waveguides to interfere; and first modulating means responsive to a first control signal to cause a relative phase shift between signals in the first and second optical waveguides, the first modulating means causing relative phase shifts in both TM mode and TE mode signals. Such devices are hereinafter referred to as "of the kind described". Examples of known devices of the kind described are lithium niobate integrated optical Mach-Zehnder modulators.

One major problem with known modulation devices of the kind described is that they display marked polarisation sensitivity. In any practical telecommunications system this can act as a severe limitation since the state of polarisation of the signal emerging from an optical waveguide (such as a length of optical fibre) can vary in a random fashion. Previous proposals for developing a lithium niobate polarisation insensitive modulator involve the use of off axis propagation. These approaches are limited by significantly increased insertion loss and difficulty of fabrication respectively.

The effect of polarisation sensitivity is that the transfer characteristic of the device for TM and TE modes is significantly different. This leaves a particular problem when the device is used as an optical switch in which a two state control function such as a voltage can be determined which correctly switches one mode but which has little useful effect on the other mode. This is a particular problem when it is desired to turn off the switch. The non-coincidence of minima of the two transfer characteristics means that a proportion of one zero mode polarisation will continue to pass through the device when it is controlled in the off state.

In accordance with the present invention, an optical signal modulation device of the kind described is characterised in that the device further comprises second modulating means responsive to a second control signal to cause a relative phase shift between signals of one mode in the first and second waveguides and to leave signals of the other mode substantially unaffected whereby the transfer characteristics of the two modes may be shifted relatively to one another in use in accordance with the second control function.

With this invention, a second modulating means is provided to cause a second relative phase shift between signals of one mode in the first and second waveguides. By a suitable choice of second control function, it can be arranged that a minimum of the transfer characteristic of the one mode is substantially coincident with a minimum of the transfer characteristic of the other mode.

This property finds particular application for devices fabricated from lithium niobate, particularly Z cut lithium niobate since the electro-optic coefficients of lithium niobate which interact with the first modulating means have a nearly integral relationship (in fact related by a factor of 3). Thus, when the device is to be used as a switch, the two state control function applied to the first modulating means can be arranged to switch between potentials related by the same factor of 3 since this will have substantially the same effect on both the TM and TE optical modes.

Although in this application the maxima will not exactly coincide, this is acceptable particularly for digital signals.

Although in theory, for certain devices, it may be possible for the second modulating means to act on the TM mode independently of the TE mode, preferably the second modulating means causes a relative phase shift between TE mode signals in the two waveguides.

Typically, the first and second modulating means each comprise electric field generating means for generating respective electric fields which are substantially orthogonal to each other and to the waveguides. In this case, the electric field generated by the second modulating means extends across only one of the waveguides. Typically, the second modulating means will apply a substantially constant bias field.

In this specification, the term "optical" is intended to refer to that part of the electromagnetic spectrum which is generally known as the visible region together with those parts of the infra-red and ultra-violet regions at each end of the visible region which are capable of being transmitted by dielectric optical waveguides such as optical fibres.

Preferably, when the device is incorporated into an optical switch, the output of the combining device is coupled with a single mode waveguide. This provides a simple way of causing the device to act as a switch since when the first control function takes up one state, only first or higher order mode signals will be generated at the combining device and will therefore not be guided by the single mode waveguide. When the first control function takes up its other state, zero order modes will result which are guided by the single mode waveguide.

BRIEF DESCRIPTION OF THE DRAWINGS

An example of an optical switch incorporating an optical signal modulation device according to the invention will now be described with reference to the accompanying drawings, in which.

DETAILED DESCRIPTION OF A PRESENTLY PREFERRED EXEMPLARY EMBODIMENT

Figure 1:
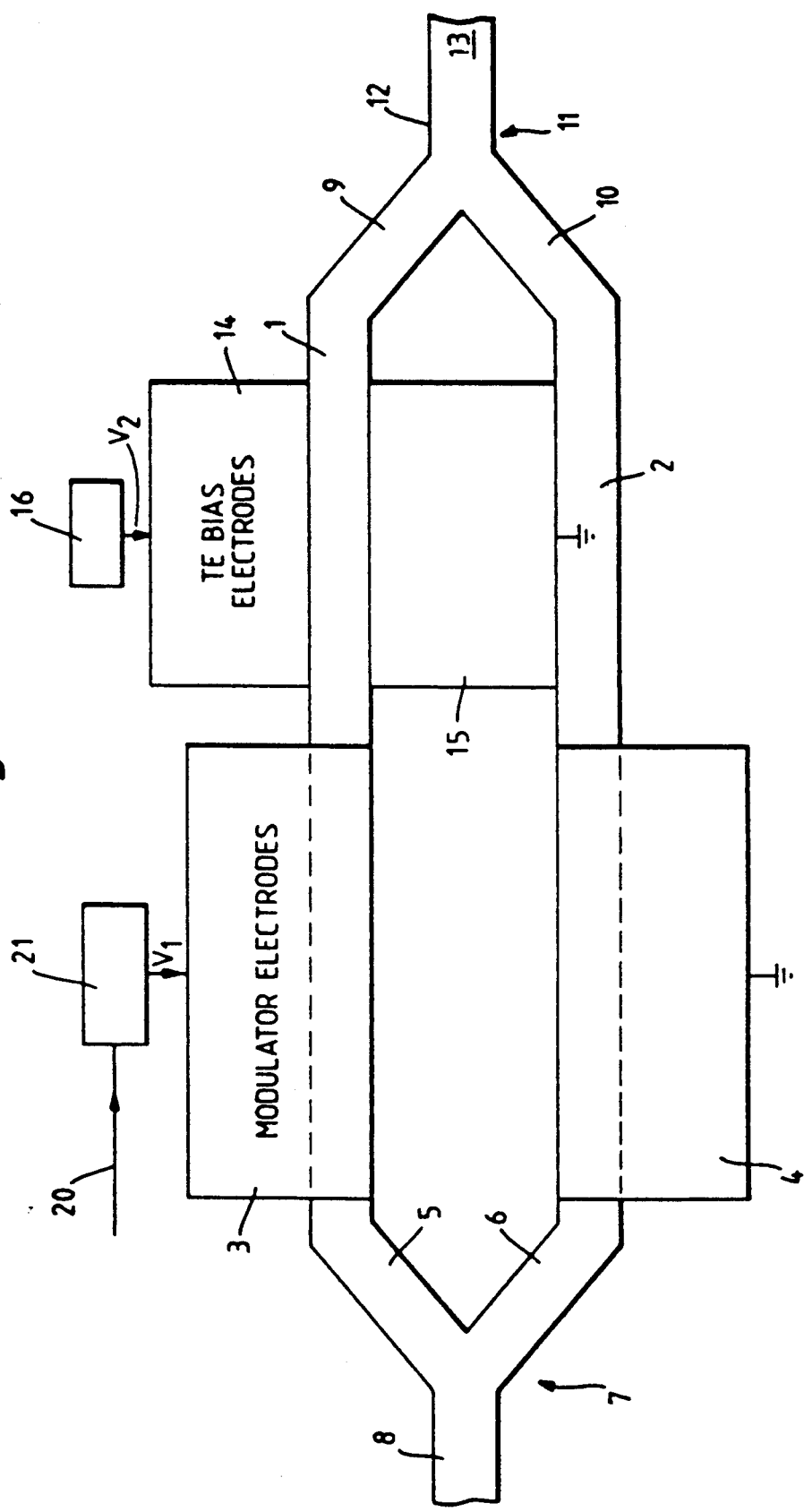
FIG. 1 is a schematic view of the device.

FIG. 1 illustrates a conventional Mach-Zehnder modulator which has been modified in a manner to be explained below. The modulator comprises first and second optical waveguides 1, 2 fabricated on Z cut lithium niobate by the standard Ti diffusion technique. An oxide buffer layer is employed in order to reduce the propagation loss for the TM optical mode. As in a conventional modulator, a pair of modulation electrodes 3, 4 are aligned directly above the optical waveguides 1, 2 thus ensuring that electro-optically induced phase shifts occur as a result of the interaction of the vertical component of the applied field and the $r_{33}(32.2\times10^{-12}mV^{-1})$ or $r_{13}(10\times10^{-12}mV^{-1})$ electro-optic coefficient of the substrate material for the TM and TE optical modes respectively. The modulator electronics are driven from a modulation voltage generator 21 to which a modulation potential is applied and where appropriate combined with a bias potential to generate the required control potential.

The optical waveguides 1, 2 are coupled with respective arms 5, 6 of an optical beam splitter 7 having an input arm 8 along which incoming optical signals are fed. The output ends of the waveguides 1, 2 are coupled to respective input arms 9, 10 of a Y coupler 11 having an output arm 12 coupled with a single mode optical fibre 13.

The device shown in FIG. 1 differs from conventional devices by the inclusion of a second electrode pair 14, 15 aligned such that the gap between the electrodes 14, 15 overlies the waveguide 1 only. A horizontal electric field is generated between the electrodes 14, 15 the size of which is controlled by a bias potential generator 16 which generates a bias potential $V_2$. This second electrode pair 14, 15 induces electro-optical phase shifts only in the TE optical mode passing along the waveguide 1 via the interaction of the horizontal component of the applied electric field and the $r_{22}(6.8\times10^{-10}mV^{-1})$ electro-optic coefficient.

Figure 2:
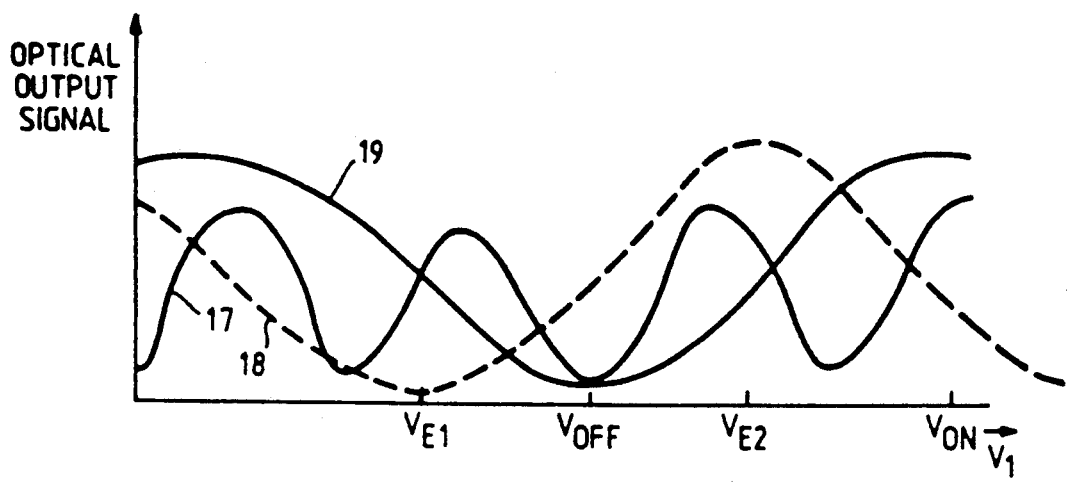
FIG. 2 illustrates graphically the TM and TE mode transfer characteristics of the FIG. 1 device for two different TE bias potentials; and, FIG. 3 shows the output for the TE and TM modes when an electrical pulse of amplitude equal to three times the switching voltage for the TM mode is applied to the modulation electrodes.

The transfer characteristics of a conventional modulator device (equivalent to the device shown in FIG. 1 in which the bias potential $V_2$ is zero) are indicated by the lines 17, 18 in FIG. 2. The line 17 indicates the characteristic for the TM mode while the line 18 indicates the characteristic for the TE mode. It will be seen in FIG. 2 that in general the maxima and minima of the characteristics do not occur at the same modulation potential $V_1$. This is particularly undesirable where the device is used as a switch since it is desired to select two values for the modulation potential $V_1$ which cause optical signals to be coupled into the single mode optical fibre 13 or not coupled respectively. In general, for a single mode injected into the device, an optical signal will be guided by the single mode fibre 13 if the portions of the signal fed along the waveguides 1, 2 are in phase on reaching the Y coupler 11 since this will produce a zero order mode at the Y coupler. There will be no guidance due to the formation of first and higher order modes at the Y coupler if there is a $\pi$ phase shift between the signals at the Y coupler. These different phase shifts can be obtained by applying suitable potentials $V_1$ to the modulator electrodes 3, 4.

It will be apparent from FIG. 2 that the potentials suitable for switching the TE mode in the conventional device are $V_{E1}$ and $V_{E2}$. However, at these potentials, the TM mode takes some intermediate values.

To deal with this, a bias potential $V_2$ is generated by the generator 16 and applied to the electrodes 14, 15. The bias potential generates an electric field between the electrodes 14, 15 which causes an additional phase shift on the TE mode signals in the optical waveguide 1 and the same signals in the waveguide 2. This causes the TE mode signals to interfere in a different manner at the Y coupler 11 and effectively shifts the transfer characteristic for the TE mode. By suitably tuning the bias voltage $V_2$ the transfer characteristic can be shifted to take up a form similar to that indicated by the line 19 in FIG. 2 in which a minimum of the TE mode characteristic 19 is coincident with a minimum of the TM mode characteristic 17. This occurs at a particular value of the modulation potential $V_1$ indicated at $V_{off}$ in FIG. 2. Due to the near integral relationship between the electro-optic coefficients of the TE and TM modes which interact with the vertical field generated between the modulator electrodes 3, 4, the two transfer characteristics 17, 19 will have substantially coincident maxima at another potential $V_{on}$. Thus, the device can be operated as a switch by causing the voltage $V_1$ to take up one of the two values $V_{off}$ and $V_{on}$. In practice, a switch control signal is supplied along a line 20 to the generator 5 which adds to the signal a suitable bias voltage to produce the desired value for $V_1$.

When used as an intensity modulator with the modulating voltage $V_1$ applied to the modulator electrodes 3, 4 the output intensity I is related to the input intensity $I_O$ by:

$$I = I_O \cos^2(\phi/2) \tag{1}$$

where $\phi$ is the phase difference between the two optical signals propagating in the two parallel waveguide arms 1, 2. In practice the phase shift $\phi$ is proportional to the electro-optic coefficient $r_{nm}$ being employed and thus the optical response of the device is dependent on the state of polarisation of the optical mode.

The device described will still display a marked polarisation sensitivity for analogue modulation signals supplied along the line 20 but will produce quasi polarisation independent operation for digital modulation signals.

Figure 3:
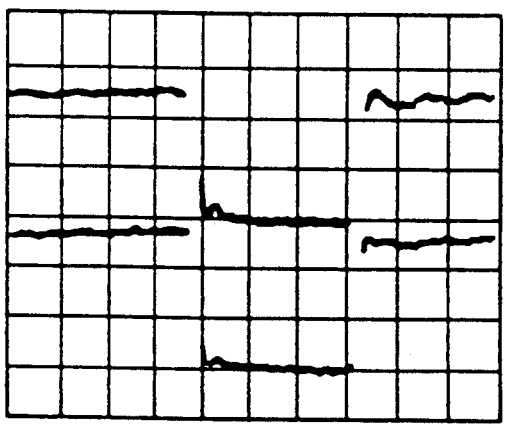

FIG. 3 shows the output for the two orthogonal modes when an electrical pulse of amplitude equal to three times the switching voltage for the TM mode is applied to the modulation electrodes. The optical output for the TM mode is driven to its maximum value but ringing appears on the leading and trailing edges due to the strong overdriving of the optical response. Since the ringing is totally confined to the leading and trailing edges of the optical pulse it is unlikely to introduce significant system penalties at data rates where the rise and fall times of a binary 1 are far less than the bit time ie. ~1Gbit/s. For the TE mode on the other hand the transition to the peak of the optical pulse occurs without ringing although additional insertion loss will arise since the peaks of the optical responses for the TE and TM modes do not exactly coincide since $r_{33}$ and $r_{13}$ are not precisely integrally related. In practice the excess loss for the TE mode is estimated to be less than 0.1dB assuming the values of the electro-optic coefficients $r_{13}$ $r_{33}$ quoted earlier.

We claim:

1. An optical signal modulation device comprising:

first and second optical waveguides connected at one ends thereof to an optical signal splitting device which couples portions of an incoming optical signal into the waveguides and at the other ends thereof to an optical signal combining device which causes optical signals received from the waveguides to interfere;

first modulating means responsive to a first control signal for causing a relative phase shift between signals in the first and second optical waveguides, the first modulating means causing relative phase shifts in both TM mode and TE mode signals; and second modulating means responsive to a bias signal, for causing a relative phase shift between signals of one mode in the first and second waveguides and to leave signals of the other mode substantially unaffected whereby the transfer characteristics of the two modes may be shifted relatively to one another in use in accordance with the bias signal such that the minima of the transfer characteristics of the TE and TM modes are substantially coincident at a predetermined magnitude of the first control signal.

2. A device according to claim 1, wherein the second modulating means causes a relative phase shift between TE mode signals in the two waveguides.

3. A device according to claim 1 wherein the first and second modulating means each comprise electric field generating means for generating respective electric fields which are substantially orthogonal to each other and to the waveguides.

4. A device according to claim 3, wherein the electric field generated by the second modulating means extends across only one of the waveguides.

5. A device according to claim 1 fabricated on Z cut lithium niobate.

6. A device according to claim 1, wherein the second modulating means is adapted to cause a substantially constant relative phase shift between signals of the one mode.

7. A device as in claim 1 wherein said bias signal is substantially constant.

8. An optical switch comprising:

first and second optical waveguides each having first and second waveguide first ends, for coupling portions of an optical signal splitting means, connected to said first and second waveguide first ends, for coupling portions of an incoming optical signal into said first and second waveguides:

an optical signal combining means connected to said first and second waveguide second ends for causing optical signals received from the first waveguide to interfere with optical signals received from the second waveguide;

first modulating means responsive to a first control signal for causing relative phase shifts in both TM mode and TE mode signals in the first and second optical waveguides;

second modulating means responsive to a second control signal for causing a relative phase shift between signals of one mode in the first and second waveguides, for substantially unaffecting signals of the other mode, and for thereby shifting the transfer characteristics of the two modes relative to one another in use in accordance with the second control signal; and first and second control function generator means connected respectively to said first and second modulating means, the first control function generator means for generating a two state control function whereby in the first state both zero order TE and TM modes are substantially cut off at the combining means and in the second state the zero order TE and TM modes are substantially at respective maximum intensities.

9. An optical switch according to claim 8, wherein the the output of the combining means is coupled with a single mode waveguide.

10. An optical switch according to claim 8, wherein the ratio of the magnitudes of the first and second states of the first control function is about 3.

11. An optical switching apparatus for switching optical signal TM and TE modes simultaneously, said apparatus including:

optical interferometer means including first and second optical waveguides, said interferometer means for splitting received light into first and second portions, for directing said first portion into said first waveguide, for directing said second portion into said second waveguide, and for recombining the light portions coupled through said first and second waveguides so as to provide interference between said first and second portions;

first modulating means, connected to receive a switching control signal and operatively coupled to said first and second waveguides, said first modulating means for inducing phase shifts in both optical signal TM and TE modes propagating through said first and second waveguides; and biasing means, coupled to only one of said first and second optical waveguides and connected to receive a bias potential, for further shifting the transfer characteristic for only one of said optical signal TM and TE modes by a substantially constant phase shift, said further shift shifting the minima of said one mode transfer characteristic into coincidence with minima of the other mode transfer characteristic.

12. Apparatus as in claim 11 wherein said further shift also shifts the maxima of said one mode transfer characteristic into coincidence with maxima of the other mode transfer characteristic.

13. Apparatus as in claim 11 wherein said biasing means shifts the transfer character of said TE mode.

14. Apparatus as in claim 11 wherein said biasing means is not responsive to said switching control signal.

15. Apparatus as in claim 11 wherein:

said switching control signal alternates between a first level $V_{off}$ and a second level $V_{on}$; and said further phase shift provided by said biasing means shifts the maxima of said one mode transfer characteristic into substantial coincidence with the maxima of said other mode transfer characteristic for said second level switching control signal and shifts the minima of said one mode transfer characteristic into coincidence with the minima of said other mode transfer characteristic for said first level switching control signal.

* * * * *